(12) United States Patent
Khan et al.

(10) Patent No.: US 7,412,708 B1
(45) Date of Patent: Aug. 12, 2008

(54) METHODS AND SYSTEMS FOR CAPTURING INFORMATION

(75) Inventors: Omar Habib Khan, Toronto (CA); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 10/814,418

(22) Filed: Mar. 31, 2004

(51) Int. Cl.
G06F 9/46 (2006.01)

(52) U.S. Cl. .................. 719/318; 707/6; 717/140
(58) Field of Classification Search ............... 719/318; 707/1–6; 717/140
See application file for complete search history.

(56) References Cited

U.S. PATENT DOCUMENTS

| | | | |
|---|---|---|---|
| 4,410,957 A | 10/1983 | Cason et al. | |
| 5,280,612 A | 1/1994 | Lorie et al. | |
| 5,321,838 A | 6/1994 | Hensley et al. | |
| 5,555,346 A | 9/1996 | Gross et al. | |
| 5,701,469 A | 12/1997 | Brandli et al. | |
| 5,742,816 A | 4/1998 | Barr et al. | |
| 5,748,954 A | 5/1998 | Mauldin | |
| 5,881,315 A | 3/1999 | Cohen | |
| 5,907,836 A | 5/1999 | Sumita et al. | |
| 5,956,722 A | 9/1999 | Jacobson | |
| 5,961,610 A | 10/1999 | Kelly et al. | |
| 5,964,839 A | 10/1999 | Johnson et al. | |
| 6,006,222 A | 12/1999 | Culliss | |
| 6,014,665 A | 1/2000 | Culliss | |
| 6,055,579 A | 4/2000 | Goyal et al. | |
| 6,073,130 A * | 6/2000 | Jacobson et al. | 707/5 |
| 6,078,916 A | 6/2000 | Culliss | |
| 6,119,147 A | 9/2000 | Toomey et al. | |
| 6,175,830 B1 * | 1/2001 | Maynard | 707/5 |
| 6,182,065 B1 * | 1/2001 | Yeomans | 707/3 |
| 6,182,068 B1 | 1/2001 | Culliss | |
| 6,199,067 B1 | 3/2001 | Geller | |
| 6,202,065 B1 | 3/2001 | Wills | |
| 6,209,000 B1 | 3/2001 | Klein et al. | |
| 6,226,630 B1 | 5/2001 | Bilmers | |
| 6,240,548 B1 * | 5/2001 | Holzle et al. | 717/140 |
| 6,275,820 B1 | 8/2001 | Navin-Chandra et al. | |

(Continued)

FOREIGN PATENT DOCUMENTS

WO  WO 02/069118  9/2002

OTHER PUBLICATIONS

U.S. Appl. No. 10/749,440, filed Dec. 31, 2003, Badros et al.

(Continued)

*Primary Examiner*—Meng-Ai An
*Assistant Examiner*—Phuong N. Hoang
(74) *Attorney, Agent, or Firm*—Fenwick & West LLP

(57) ABSTRACT

Systems and methods for capturing information are described. In one embodiment, an event having an associated article is identified, article data associated with the article is identified, and a capture score for the event is determined based at least in part on article data. Article data can comprise, for example, one or a combination of a location of the article, a file-type of the article, and access data for the article. Event data associated with the event is compiled responsive at least in part to a comparison of the capture score and a threshold value.

46 Claims, 3 Drawing Sheets

U.S. PATENT DOCUMENTS

| | | | |
|---|---|---|---|
| 6,275,957 B1 | 8/2001 | Novik et al. | |
| 6,282,548 B1 | 8/2001 | Burner et al. | |
| 6,341,371 B1* | 1/2002 | Tandri | 717/158 |
| 6,363,373 B1* | 3/2002 | Steinkraus | 707/3 |
| 6,446,076 B1 | 9/2002 | Burkey et al. | |
| 6,477,585 B1 | 11/2002 | Cohen et al. | |
| 6,480,837 B1* | 11/2002 | Dutta | 707/3 |
| 6,513,036 B2 | 1/2003 | Fruensgaard et al. | |
| 6,526,405 B1* | 2/2003 | Mannila et al. | 707/6 |
| 6,532,023 B1 | 3/2003 | Schumacher et al. | |
| 6,560,655 B1 | 5/2003 | Grambihler et al. | |
| 6,581,056 B1 | 6/2003 | Rao | |
| 6,592,627 B1 | 7/2003 | Agrawal et al. | |
| 6,604,236 B1 | 8/2003 | Draper et al. | |
| 6,658,423 B1 | 12/2003 | Pugh et al. | |
| 6,681,247 B1* | 1/2004 | Payton | 709/217 |
| 6,691,175 B1 | 2/2004 | Lodrige et al. | |
| 6,728,763 B1 | 4/2004 | Chen | |
| 6,772,143 B2 | 8/2004 | Hung | |
| 6,779,030 B1 | 8/2004 | Dugan et al. | |
| 6,826,553 B1* | 11/2004 | DaCosta et al. | 707/1 |
| 6,853,950 B1* | 2/2005 | O'Reilly et al. | 702/179 |
| 6,865,715 B2 | 3/2005 | Uchino et al. | |
| 6,907,577 B2 | 6/2005 | Tervo | |
| 6,934,740 B1 | 8/2005 | Lawande et al. | |
| 6,963,830 B1 | 11/2005 | Nakao | |
| 6,981,040 B1 | 12/2005 | Konig et al. | |
| 7,016,919 B2 | 3/2006 | Cotton et al. | |
| 7,080,073 B1 | 7/2006 | Jiang et al. | |
| 7,099,887 B2 | 8/2006 | Hoth et al. | |
| 7,162,473 B2 | 1/2007 | Dumais et al. | |
| 7,330,536 B2 | 2/2008 | Claudatos et al. | |
| 2001/0016852 A1 | 8/2001 | Peairs et al. | |
| 2002/0042789 A1 | 4/2002 | Michalewicz et al. | |
| 2002/0049608 A1 | 4/2002 | Hartsell et al. | |
| 2002/0059425 A1 | 5/2002 | Belfiore et al. | |
| 2002/0065802 A1 | 5/2002 | Uchiyama | |
| 2002/0073076 A1 | 6/2002 | Xu et al. | |
| 2002/0078256 A1 | 6/2002 | Gehman et al. | |
| 2002/0091568 A1 | 7/2002 | Kraft et al. | |
| 2002/0091972 A1* | 7/2002 | Harris et al. | 714/47 |
| 2002/0103664 A1 | 8/2002 | Olsson et al. | |
| 2002/0116291 A1 | 8/2002 | Grasso et al. | |
| 2002/0138467 A1 | 9/2002 | Jacobson et al. | |
| 2002/0156760 A1 | 10/2002 | Lawrence et al. | |
| 2002/0165903 A1 | 11/2002 | Zargham et al. | |
| 2002/0174101 A1 | 11/2002 | Fernley et al. | |
| 2002/0178383 A1 | 11/2002 | Hrabik et al. | |
| 2003/0001854 A1 | 1/2003 | Jade et al. | |
| 2003/0018521 A1 | 1/2003 | Kraft et al. | |
| 2003/0028896 A1 | 2/2003 | Swart et al. | |
| 2003/0050909 A1 | 3/2003 | Preda et al. | |
| 2003/0055816 A1* | 3/2003 | Paine et al. | 707/3 |
| 2003/0088433 A1 | 5/2003 | Young et al. | |
| 2003/0123442 A1 | 7/2003 | Drucker et al. | |
| 2003/0123443 A1 | 7/2003 | Anwar | |
| 2003/0130984 A1 | 7/2003 | Quinlan et al. | |
| 2003/0131000 A1 | 7/2003 | Bates et al. | |
| 2003/0149694 A1 | 8/2003 | Ma et al. | |
| 2003/0154071 A1 | 8/2003 | Shreve | |
| 2003/0167266 A1 | 9/2003 | Saldanha et al. | |
| 2004/0003038 A1 | 1/2004 | Huang et al. | |
| 2004/0031027 A1 | 2/2004 | Hiltgen | |
| 2004/0095852 A1 | 5/2004 | Griner et al. | |
| 2004/0098609 A1 | 5/2004 | Bracewell et al. | |
| 2004/0128285 A1 | 7/2004 | Green et al. | |
| 2004/0133560 A1 | 7/2004 | Simske | |
| 2004/0133561 A1 | 7/2004 | Burke | |
| 2004/0143569 A1 | 7/2004 | Gross et al. | |
| 2004/0187075 A1 | 9/2004 | Maxham et al. | |
| 2004/0193596 A1 | 9/2004 | Defelice et al. | |
| 2004/0215715 A1 | 10/2004 | Ehrich et al. | |
| 2004/0254938 A1 | 12/2004 | Marcjan et al. | |
| 2004/0255301 A1 | 12/2004 | Turski et al. | |
| 2004/0267700 A1 | 12/2004 | Dumais et al. | |
| 2005/0021542 A1 | 1/2005 | Irle et al. | |
| 2005/0033803 A1 | 2/2005 | Vleet et al. | |
| 2005/0060310 A1 | 3/2005 | Tong et al. | |
| 2005/0060719 A1 | 3/2005 | Gray et al. | |
| 2005/0076115 A1 | 4/2005 | Andrews et al. | |
| 2005/0114487 A1 | 5/2005 | Peng et al. | |
| 2005/0262073 A1 | 11/2005 | Reed et al. | |
| 2006/0167704 A1 | 7/2006 | Nicholls et al. | |
| 2007/0055689 A1 | 3/2007 | Rhoads et al. | |

OTHER PUBLICATIONS 80-20 Software—Products—80-20 One Search, http://www.80-20.com/products/one-search/retriever.asp, printed Mar. 16, 2004.

"askSam™ Making Information Useful," askSam,—Organize your information with askSam, http://asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geet.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

Devonthink, http://www.devon-techonologies.com/products/devonthink.php, printed Mar. 16, 2004.

dtSearch® -http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May. 21, 2004.

"Overview," Stuff I've Seen—Home Page, http://research.Microsoft.com/adapt/sis/index.htm, pp. 1-2, printed May. 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology*(PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business to Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture Of The Obelix—An Improved Internet Search Engine," Proceedings of the 33rd Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

\* cited by examiner

METHODS AND SYSTEMS FOR CAPTURING INFORMATION

FIELD OF THE INVENTION

The invention generally relates to search engines. More particularly, the invention relates to methods and systems for capturing information.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Conventional client-device search applications also typically index all articles of specified types and may not consider how important each article is. This can lead to performance problems as the client-device may be unable to handle the load of indexing the volume of articles, or may not have enough storage space. Alternatively, the client device may handle the load but the indexing may noticeably slow down or otherwise affect the computer experience for the user, or the user may prefer to conserve disk space to make it available for future activities. Hence, it is desirable to limit the volume of articles indexed.

Additionally, conventional client-device search applications can require an explicit search query from a user to generate results, and may be limited to examining file names or the contents of a particular application's files.

SUMMARY

Embodiments of the present invention comprise methods and systems for capturing information. In one embodiment, an event having an associated article is identified, article data associated with the article is identified, and a capture score for the event is determined based at least in part on the article data. Article data can comprise, for example, one or a combination of a location of the article, a file-type of the article and access data for the article.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
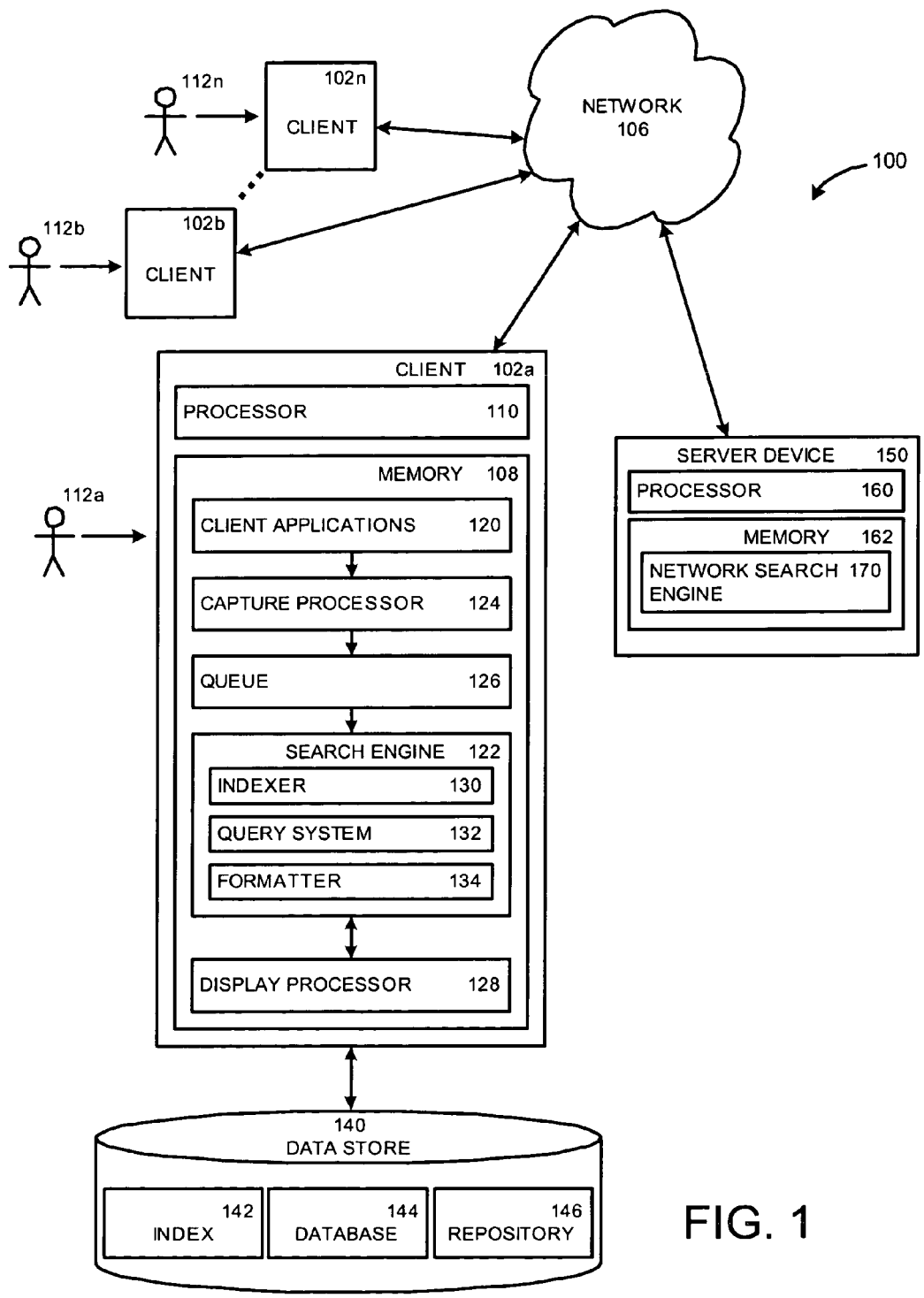
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an instant messenger message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the viewing of a web page by a user can comprise the URL of the web page, the time and date the user viewed the web page, the content of the web page in original or processed forms, a screenshot of the page as displayed to the user, and a thumbnail version of the screenshot.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger message event sent by the user 112a can include a recipient or list of recipients, the time sent, the date sent, content of the message, and a conversation ID. An event schema for a web page currently being viewed by a user can include the Uniform Resource Locator or URL of the web page, the time being viewed, and the content of the web page. An event schema for a word processing document being saved by a user can include the title of the document, the time saved, the location of the document, the format of the document, and the text of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. The importance may be measured by a capture score associated with and/or determined for the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In one embodiment, the search engine 122 may selectively capture and index historical events. For example, article data associated with the article for the event can be used in part to determine whether to capture and index the event. Article data can comprise, for example, the location of the article, the file type of the article, and access data for the article. In one embodiment, article data is used to determine a capture score and the capture score is compared to a threshold value. If the capture score for a particular event is above the threshold value, then the event is captured and indexed. If the capture score for an article is below the threshold value, then the event is not captured or indexed. Similarly, the search engine 122 may selectively capture and index real-time events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

In one embodiment, when the indexer 130 receives an event, the indexer 130 can determine, from the event, terms (if any) associated with the event, the time of the event (if available), images (if any) associated with the event, and any other information defining the event. The indexer 130 can also determine if the event relates to other events and associate the event with related events. Related events can be associated with each other in a related event object, which can be stored in the data store 140. The indexer 130 can send and incorporate the terms and times, associated with the event in the index 142 of the data store 140. The event can be sent to the database 144 for storage and the content of the associated article and any associated images can be stored in the repository 146.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102a is a stand-alone device and is not coupled to a network. The system 100 shown in FIG. 1 is merely exemplary, and is used to explain the exemplary methods shown in FIGS. 2 through 3.

Various methods in accordance with embodiments of the present invention may be carried out. For example, in one embodiment, an event having an associated article is identified. The event can be a historical event and can be identified during a crawl of a client device. Further, article data associated with the article is identified. Article data can comprise one or more of a location of the article, a file-type of the article and access data for the article. The location of the article can be a directory identifier in which the article is stored. A capture score for the event can be determined based at least in part on the article data.

In one embodiment, a threshold value can be determined. The threshold value can be predetermined and/or can be determined based on user behavior. Event data associated with the event can be compiled if the capture score is above a threshold value. In one embodiment, if the capture score is above the threshold value, then the event is indexed and/or stored. The event may not be indexed and/or stored if the capture score is below the threshold value.

In one embodiment, the capture score can be determined at least in part by associating at least one weight with the article data and/or with the one or more fields of an associated event schema. The capture score can be determined at least in part by associating a weight with the location of the article. The capture score can be determined at least in part by associating a weight with the file type of the article. These weights can be determined at least in part by user behavior. It can be determined if the article meets at least one criteria, such as that it has not been accessed in a year, and the event associated with the article may not be captured if the article meets at least one criteria.

Figure 2:
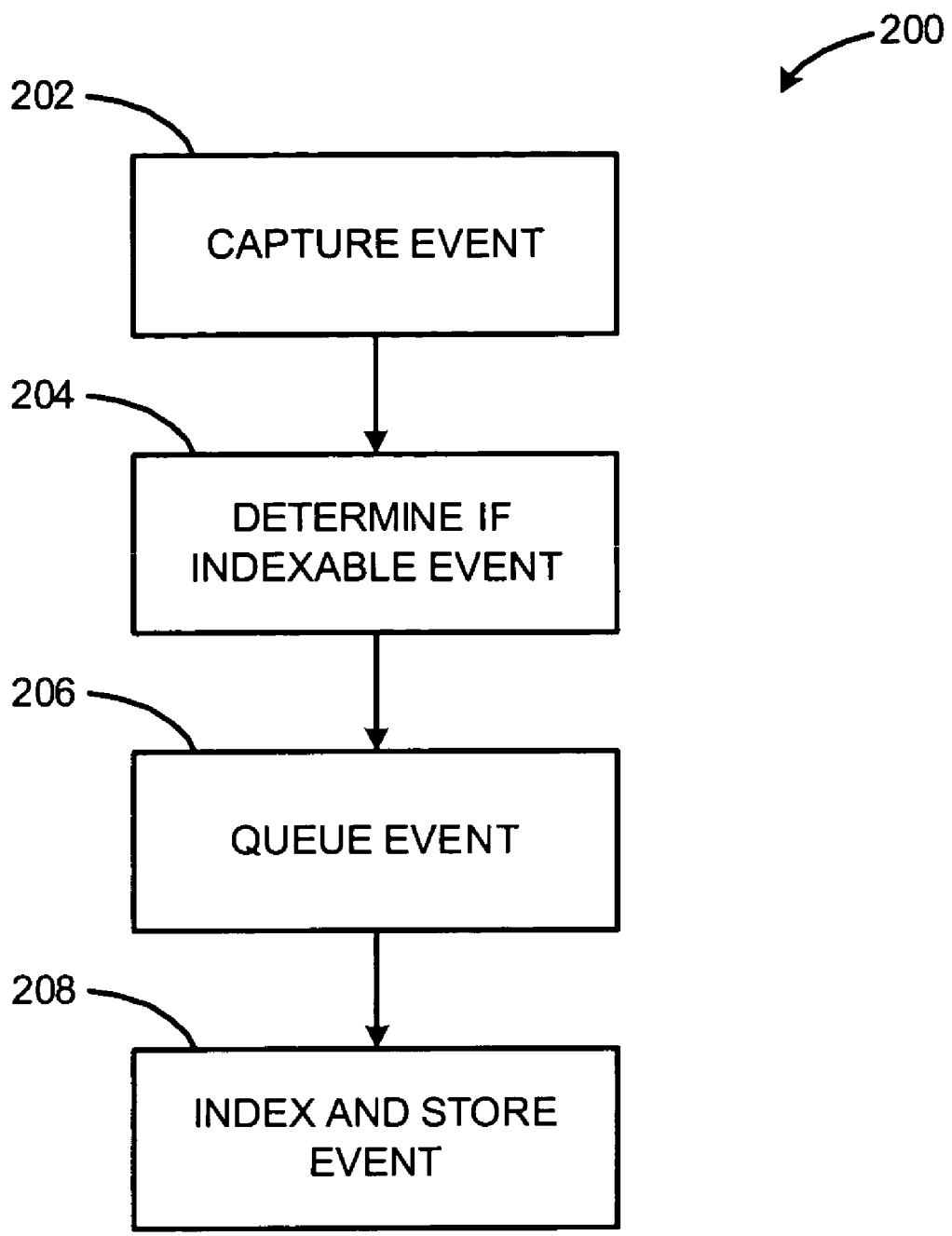
FIG. 2 is a flow diagram illustrating an exemplary method of capturing and processing event data associated with a client device in one embodiment of the present invention.

FIG. 2 illustrates an exemplary method 200 that provides a method for capturing and processing an event. This exemplary method is provided by way of example, as it will be appreciated from the foregoing description of exemplary embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The event can be a real-time event or can be a historical event. The capture processor 124 can capture a real-time event by identifying and compiling event data associated with the event upon the occurrence of the event. The capture processor 124 can capture a historical event, for example, by periodically crawling the memory 108 or associated data storage device of the client device 112a for previously uncaptured articles or receiving articles or data from client applications and identifying and compiling event data associated with the event. The capture processor 124 may have separate capture components for each client application, network monitoring, performance data capture, keystroke capture, and display capture. In one embodiment, the capture component can use a generalized event definition mechanism, such as an event schema that it has previously defined and registered with the client device 102a, to capture or express the event.

Figure 3:
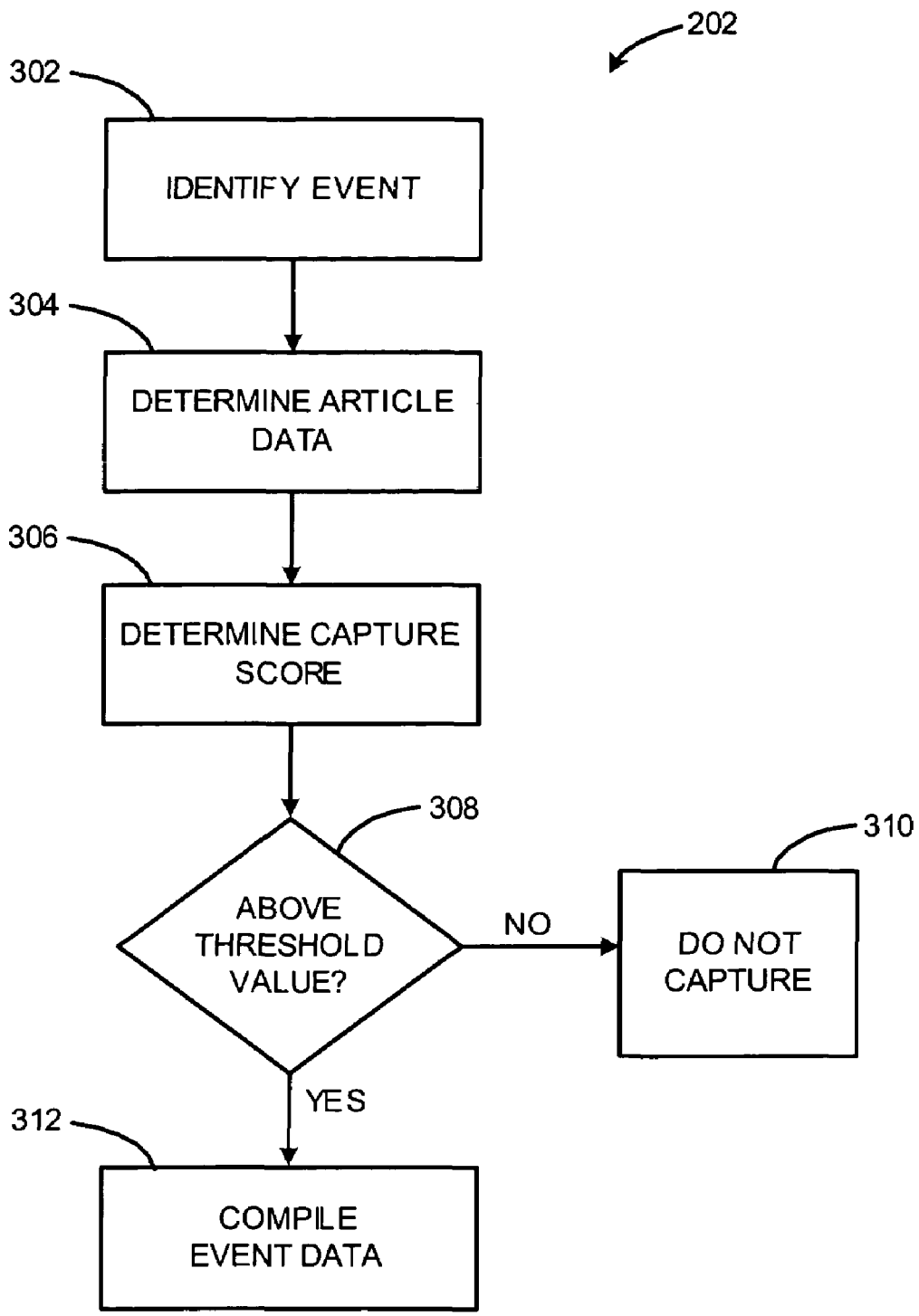
FIG. 3 is a flow diagram illustrating an exemplary method of capturing a historical event of the present invention.

FIG. 3 illustrates an exemplary method 202 for capturing a historical event. While FIG. 3 illustrates a method for capturing a historical event, one skilled in the art will appreciate the method is applicable in whole or part to the capture of a real-time event. In 302, a historical event is identified. In one embodiment, the capture processor 124 can crawl memory 108 and an associated storage device of the client device 102a when the search engine 122 is installed and can then periodically crawl after installation to search for historical events. Historical events can be events that occurred before the installation of the search engine 122 or were otherwise not captured, because, for example, the search engine 122 was not operational for a period of time while the client device 102a was operational or because no capture component exists for a specific type of event. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the capture processor 124 crawls or otherwise retrieves information from select directories of the user. These directories can be designated by the user or determined by the capture processor 124 or search engine 122. A real-time event can be identified by the capture processor 124, in one embodiment, upon the occurrence of the event.

A historical event can have an article associated with it. Examples of historical events can comprise the user's saved word processing documents, presentation documents, calendar entries, and spreadsheet documents, the emails in a user's inbox, and the web pages book marked by the user.

In 304, article data associated with the event article can be determined. Article data can comprise, for example, one or more of the location of the article (such as an identifier of the storage location of the article), the file type of the article, and access data regarding the article. Where an article is located can be an indication of the importance to the user of the article. For example, users of certain operating systems, such as Microsoft Windows®, tend to store important articles in certain directories, such as "My Documents", "My Pictures", and "My Music". If, for example, an article is located in the My Documents directory, then this can be an indication that the article is important to the user. Additionally, if the article is stored close to one of the user's frequently used directories, this can also be an indication of the importance of the article to the user. Users can be generally interested in certain file types, such as word processing files, presentation files, spreadsheet files, emails, pdf files, text files, sound files, image files, video files and HTML files. Thus, the file type of an article can be an indication that the article is important to the user. Access data associated with the article can also be an indication of the importance of the article to the user 112a. Access data can comprise a measure of recency or frequency associated with the user's access of the article, such as the time and date of the last time the article was accessed by the user 112a including opened, saved, printed, sent, received, or otherwise accessed by the user. Similarly, access data may include a relative frequency with which an article was opened, saved, printed, sent, received, or otherwise accessed by the user.

In 306, a capture score for the event is determined. The capture score can be a representation of how important the event and associated article are to the user 112a. In one embodiment, the capture score may be determined based on the article data or one or more fields in an associated event schema. As described above, article data can comprise, for example, one or more of the location of the article, the file type of the article, and access data regarding the article. Each type of article data can be weighted differently. For example, the file type of the article can be weighted more heavily than other article data. In one embodiment, a capture score can be determined by associating a weight or weights with the article data associated with the event.

In one embodiment, the capture score can be determined by associating weights with different file types. For example, in one embodiment, .doc files may be more important and have a higher weight than .txt files. In this same example, .txt files may more important and have a higher weight than .png files. These different weights can be used to compute the capture score. User behavior can be used to determine and adjust these weights associated with each file type. For example, how often the particular user uses files of each file type and/or how often the user selects files of a given file type in search results can be monitored and determined. For example, a user may often create Instant Messenger messages but may never search for such messages.

In one embodiment, the capture score can be determined by associating weights with different locations of articles, such as storage locations. For example, articles stored in a first location, such as "My Documents", may be considered more important and have a higher weight, that articles located in c:\windows or articles located on the network. What locations are important to individual users can vary and so can be determined and adjusted based on user behavior. The capture score can be determined by associating weights with one or more fields in an associated event schema. For example, the email field "To" may increase the capture score if the user's explicit email address is in this field. Alternatively, the capture score may be decreased if the user's email address is not present in this field.

In one embodiment, the recency of access of the article may be a factor in the capture score determination. For example, if an event has an associated article that has not been accessed in over a year, then the capture score can reflect the article's relatively low importance. The frequency of access to an article may be a factor in the capture score determination. For example, if an event has an associated article that is saved very frequently, then the capture score can reflect the article's relatively high importance. In another embodiment, the frequency of access information can further be used to determine whether to index and/or store the associated event. For example, if an event has an associated article that is saved very frequently, it may be desirable to not index and store the event every time, but rather every n times, or at most once every time period, such as once per hour. Alternatively, the event may be stored, but not indexed, or may be partially stored and/or partially indexed.

A combination of the above factors may be used. For example, a .txt file may be considered important if it is in a particular location, such as My Documents, but not important if it is in another location, such as c:\(as some applications automatically create .txt files in this and other directories). In this example, a .doc file may be considered important in both places. In one embodiment, for example, different weights associated with an article can be combined by associating an initial score of 1 with the article and multiplying by the different weights associated with the article. Weights greater than 1 can indicate a factor that is important and weights less than 1 can indicate a factor that is less important.

In one embodiment, some pre-filtering may be done before computing the capture score. The capture processor 124 may determine if an article meets certain criteria and if the article meets the criteria, the capture processor 124 may not capture the event. For example, a filter may be that articles that are older than a year are not indexed and/or stored and thus, no capture score need be computed.

In 308, the capture score for the event is compared with a threshold value. The threshold value can represent a level of importance that the event must be in order to be captured and indexed. In one embodiment, the threshold value is a predetermined value. In another embodiment, the threshold value is determined based at least in part on the capture scores for a plurality of events. In one embodiment a very low threshold can be set initially and then adjusted based on the user's behavior. The initial threshold can also be set based on analysis of a number of other users to create typical or average scores.

In one embodiment, for example, initially all events can be captured and a capture score for each event (and associated article) can be computed. A running average and standard deviation of the capture scores can be determined. When a suitable number of data points are determined, events can begin to be filtered out. For example, events with a capture score that is less than the average by, for example, 1 or more standard deviations can be determined to be below the threshold.

The average capture score may differ a great amount across different event types. For example, web pages events may have quite high capture scores compared to word processing document events. In one embodiment, the average capture score and standard deviation for each event type can be kept individually. The capture scores for an event can be compared to the average capture score for the type of event. In one embodiment, the capture score for an event can also be compared to the global average capture score as well.

In 310, the event is not captured if the capture score is below the threshold value. Events falling below the threshold value are deemed not to be important enough to the user 112a to use client-device 102a resources to capture and index the event.

In 312, the event data associated with the event is compiled, if the capture score for the event is above the threshold value. Events with capture scores above the threshold value are deemed to be important enough to the user 112a to capture and index the event. In one embodiment, the event data is compiled using an event schema.

Returning to FIG. 2, in 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed or sent for storage by the indexer 130. Indexable events can be indexable real-time events or historical events.

If an indexable event is determined, then, in 206, the event can be sent by the capture processor 124 to the queue 126 with an indication that it is an indexable event. In the embodiment shown in FIG. 2, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, in 206, the non-indexable event can be sent by the capture processor 124 to the user state queue of the queue 126 with an indication that it is not to be indexed.

In one embodiment, the queue 126 holds the event until a condition is met, such as the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the indexer 130 indexes and stores the event. The indexer 130 can retrieve an event from the queue 126 when it is ready to process the event. In one embodiment, the indexer 130 determines if the event is a duplicate event and if not assigns an Event ID to the event. The indexer 130 can also associate the event with related events. In the embodiment shown in FIG. 2, the indexer determines indexable terms associated with the event, dates and times associated with the event, and other data associated with the event from the event schema. The indexer 130 can associate the Event ID with the indexable terms that are contained in the index 142. The event can be stored in the database 144 and the content of the event can be stored in the repository 146.

The environment shown reflects a client-side search engine architecture embodiment. Other embodiments are possible, such as a stand-alone client device or a network search engine.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method, comprising:
    identifying an event, the event comprising a user interaction with an article stored on a client device;
    identifying article data associated with the article;
    determining a capture score for the event based at least in part on the article data, the determining comprising:
        populating one or more fields of an event schema responsive to the article data;
        associating one or more weights with the one or more fields of the event schema, a weight being a value indicating a relative importance of a field; and
        generating the capture score responsive at least in part to the weights and contents of the populated fields of the event schema; and
    compiling event data associated with the event responsive at least in part to a comparison of the capture score and a threshold value, the threshold value determined based at least in part on user behavior, the compiling comprising storing the contents of one or more fields of the event schema.

2. The method of claim 1, wherein the article data comprises a location of the article.

3. The method of claim 2, wherein the capture score is determined at least in part by associating a weight with the location of the article.

4. The method of claim 3, wherein the weight is determined at least in part by user behavior.

5. The method of claim 2, wherein the location of the article comprises a directory identifier in which the article is stored.

6. The method of claim 1, wherein the article data comprises a file type of the article.

7. The method of claim 6, wherein the capture score is determined at least in part by associating a weight with the file type of the article.

8. The method of claim 7, wherein the weight is determined at least in part by user behavior.

9. The method of claim 1, wherein the article data comprises access data associated with the article.

10. The method of claim 9, wherein access data comprises recency associated with access of the article.

11. The method of claim 9, wherein access data comprises frequency associated with access of the article.

12. The method of claim 1, wherein the capture score is determined at least in part by associating at least one weight with the article data.

13. The method of claim 12, wherein the weight is determined at least in part by user behavior.

14. The method of claim 1, wherein the threshold value is predetermined.

15. The method of claim 1, further comprising indexing the event responsive at least in part to a comparison of the capture score and the threshold value.

16. The method of claim 1, further comprising storing the event responsive at least in part to a comparison of the capture score and the threshold value.

17. The method of claim 1, further comprising not indexing the event responsive at least in part to a comparison of the capture score and the threshold value.

18. The method of claim 1, further comprising not storing the event responsive at least in part to a comparison of the capture score and the threshold value.

19. The method of claim 1, wherein the event is a historical event.

20. The method of claim 1, wherein the article is identified during a crawl of a memory or an associated storage device of the client device.

21. The method of claim 1, further comprising determining if the article meets at least one criterion and not capturing the event if the article meets the criterion.

22. The method of claim 1, wherein the threshold value is an average of capture scores for other events.

23. A computer-readable storage medium containing program code executable by a processor, comprising:
- program code for identifying an event, the event comprising a user interaction with an article stored on a client device;
- program code for identifying article data associated with the article;
- program code for determining a capture score for the event based at least in part on the article data, the determining comprising:
  - populating one or more fields of an event schema responsive to the article data;
  - associating one or more weights with the one or more fields of the event schema, a weight being a value indicating a relative importance of a field; and
  - generating the capture score responsive at least in part to the weights and contents of the populated fields of the event schema; and
- program code for compiling event data associated with the event responsive at least in part to a comparison of the capture score and a threshold value, the threshold value determined based at least in part on user behavior, the compiling comprising storing the contents of one or more fields of the event schema.

24. The computer-readable medium of claim 23, wherein the article data comprises a location of the article.

25. The computer-readable medium of claim 24, wherein the capture score is determined at least in part by associating a weight with the location of the article.

26. The computer-readable medium of claim 25, wherein the weight is determined at least in part by user behavior.

27. The computer-readable medium of claim 24, wherein the location of the article comprises a directory identifier in which the article is stored.

28. The computer-readable medium of claim 23, wherein the article data comprises a file type of the article.

29. The computer-readable medium of claim 28, wherein the capture score is determined at least in part by associating a weight with the file type of the article.

30. The computer-readable medium of claim 29, wherein the weight is determined at least in part by user behavior.

31. The computer-readable medium of claim 23, wherein the article data comprises access data associated with the article.

32. The computer-readable medium of claim 31, wherein access data comprises recency associated with access of the article.

33. The computer-readable medium of claim 32, wherein the capture score is determined at least in part by associating at least one weight with the article data.

34. The computer-readable medium of claim 33, wherein the weight is determined at least in part by user behavior.

35. The computer-readable medium of claim 31, wherein access data comprises frequency associated with access of the article.

36. The computer-readable medium of claim 23, wherein the threshold value is predetermined.

37. The computer-readable medium of claim 23, further comprising program code for indexing the event responsive at least in part to a comparison of the capture score and the threshold value.

38. The computer-readable medium of claim 23, further comprising program code for storing the event responsive at least in part to a comparison of the capture score and the threshold value.

39. The computer-readable medium of claim 23, further comprising program code for not indexing the event responsive at least in part to a comparison of the capture score and the threshold value.

40. The computer-readable medium of claim 23, further comprising program code for not storing the event responsive at least in part to a comparison of the capture score and the threshold value.

41. The computer-readable medium of claim 23, wherein the event is a historical event.

42. The computer-readable medium of claim 23, wherein the article is identified during a crawl of memory or an associated storage device of the client device.

43. The computer-readable medium of claim 23, further comprising program code for determining if the article meets at least one criterion and not capturing the event if the article meets the criterion.

44. The computer-readable medium of claim 23, wherein the threshold value is an average of capture scores for other events.

45. A computer system having a processor, comprising:
- a means executed on the processor for determining a capture score for an event, the event comprising a user interaction with an article stored on a client device, the determining comprising:
  - populating one or more fields of an event schema responsive to article data associated with the article;
  - associating one or more weights with the one or more fields of the event schema, a weight being a value indicating a relative importance of a field; and
  - generating the capture score responsive at least in part to the weights and contents of the populated fields of the event schema; and
- a means executed on the processor for indexing the event responsive at least in part to a comparison of the capture score and a threshold values the threshold value determined based at least in part on user behavior.

46. The system of claim 45, further comprising a means executed on the processor for storing the event responsive at least in part to a comparison of the capture score and a threshold value.

* * * * *

UNITED STATES PATENT AND TRADEMARK OFFICE
CERTIFICATE OF CORRECTION

| | |
|---|---|
| PATENT NO. | : 7,412,708 B1 |
| APPLICATION NO. | : 10/814418 |
| DATED | : August 12, 2008 |
| INVENTOR(S) | : Omar Habib Khan et al. |

Page 1 of 1

It is certified that error appears in the above-identified patent and that said Letters Patent is hereby corrected as shown below:

Column 16, Line 49, Claim 45

Please delete "values" and insert --value,--.

Signed and Sealed this

Eighteenth Day of November, 2008

JON W. DUDAS
*Director of the United States Patent and Trademark Office*